(12) United States Patent
Kassner

(10) Patent No.: US 8,274,170 B2
(45) Date of Patent: Sep. 25, 2012

(54) WIND POWER TURBINE INCLUDING A CABLE BUNDLE GUIDE DEVICE

(75) Inventor: Thomas Kassner, Dresden (DE)

(73) Assignee: Willic S.A.R.L., Luxembourg (LU)

( * ) Notice: Subject to any disclaimer, the term of this patent is extended or adjusted under 35 U.S.C. 154(b) by 277 days.

(21) Appl. No.: 12/755,131

(22) Filed: Apr. 6, 2010

(65) Prior Publication Data

US 2011/0084491 A1    Apr. 14, 2011

(30) Foreign Application Priority Data

Apr. 9, 2009    (IT) .............................. MI2009A0572

(51) Int. Cl.
F03D 9/00    (2006.01)
(52) U.S. Cl. ...................................................... 290/55
(58) Field of Classification Search .................... 290/44, 290/55
See application file for complete search history.

(56) References Cited

U.S. PATENT DOCUMENTS

| | | | |
|---|---|---|---|
| 1,894,357 A | 1/1933 | Manikowske et al. |
| 1,948,854 A | 2/1934 | Heath |
| 1,979,813 A | 11/1934 | Reis |
| 2,006,172 A | 6/1935 | Klappauf |
| 2,040,218 A | 5/1936 | Soderberg |
| 2,177,801 A | 10/1939 | Erren |
| 2,469,734 A | 5/1949 | Ledwith |
| 2,496,897 A | 2/1950 | Strickland |
| 2,655,611 A | 10/1953 | Sherman |
| 2,739,253 A | 3/1956 | Plumb |
| 2,806,160 A | 9/1957 | Brainard |
| 2,842,214 A | 7/1958 | Prewitt |
| 2,903,610 A | 9/1959 | Bessiere |
| 3,004,782 A | 10/1961 | Meermans |
| 3,072,813 A | 1/1963 | Reijnst et al. |
| 3,083,311 A | 3/1963 | Krasnow |
| 3,131,942 A | 5/1964 | Ertaud |
| 3,168,686 A | 2/1965 | King et al. |

(Continued)

FOREIGN PATENT DOCUMENTS

CA    2404939    4/2004

(Continued)

OTHER PUBLICATIONS

Maxime R. Dubous, Henk Polinder, Study of TFPM Machines with Toothed Rotor Applied to Direct-Drive Generators for Wind Turbines, 2004.

(Continued)

*Primary Examiner* — Tho D Ta
(74) *Attorney, Agent, or Firm* — Neal, Gerber & Eisenberg LLP

(57) ABSTRACT

A wind power turbine for producing electric energy has a pylon extending from a bottom end to a top end; a nacelle fitted to the top end of the pylon to rotate about a first axis; an electric generator fitted to the nacelle to produce electric energy; a blade assembly, which rotates with respect to the nacelle about a second axis; an electric cable bundle extending from the electric generator to a point inside the pylon, such as at the bottom end of the pylon; and a guide device for guiding the cable bundle, and configured to divert the cable bundle radially from a point close to the first axis, to a point substantially away from the first axis.

26 Claims, 4 Drawing Sheets

U.S. PATENT DOCUMENTS

| | | |
|---|---|---|
| 3,221,195 A | 11/1965 | Hoffmann |
| 3,363,910 A | 1/1968 | Toronchuk |
| 3,364,523 A | 1/1968 | Schippers |
| 3,392,910 A | 7/1968 | Tanzberger |
| 3,468,548 A | 9/1969 | Webb |
| 3,700,247 A | 10/1972 | Butler et al. |
| 3,724,861 A | 4/1973 | Lesiecki |
| 3,746,349 A | 7/1973 | Smale et al. |
| 3,748,089 A | 7/1973 | Boyer et al. |
| 3,789,252 A | 1/1974 | Abegg |
| 3,841,643 A | 10/1974 | McLean |
| 3,860,843 A | 1/1975 | Kawasaki et al. |
| 3,942,026 A | 3/1976 | Carter |
| 3,963,247 A | 6/1976 | Nommensen |
| 3,968,969 A | 7/1976 | Mayer et al. |
| 4,022,479 A | 5/1977 | Orlowski |
| 4,061,926 A | 12/1977 | Peed |
| 4,087,698 A | 5/1978 | Myers |
| 4,273,343 A | 6/1981 | Visser |
| 4,289,970 A | 9/1981 | Deibert |
| 4,291,235 A | 9/1981 | Bergey, Jr. et al. |
| 4,292,532 A | 9/1981 | Leroux |
| 4,336,649 A | 6/1982 | Glaser |
| 4,339,874 A | 7/1982 | Mc'Carty et al. |
| 4,348,604 A | 9/1982 | Thode |
| 4,350,897 A | 9/1982 | Benoit |
| 4,354,126 A | 10/1982 | Yates |
| 4,368,895 A | 1/1983 | Okamoto et al. |
| 4,398,773 A | 8/1983 | Boden et al. |
| 4,452,046 A | 6/1984 | Valentin |
| 4,482,831 A | 11/1984 | Notaras et al. |
| 4,490,093 A | 12/1984 | Chertok et al. |
| 4,517,483 A | 5/1985 | Hucker et al. |
| 4,517,484 A | 5/1985 | Dacier |
| 4,521,026 A | 6/1985 | Eide |
| 4,585,950 A | 4/1986 | Lund |
| 4,613,779 A | 9/1986 | Meyer |
| 4,638,200 A | 1/1987 | Le Corre et al. |
| 4,648,801 A | 3/1987 | Wilson |
| 4,694,654 A | 9/1987 | Kawamura |
| 4,700,096 A | 10/1987 | Epars |
| 4,714,852 A | 12/1987 | Kawada et al. |
| 4,720,640 A | 1/1988 | Anderson et al. |
| 4,722,661 A | 2/1988 | Mizuno |
| 4,724,348 A | 2/1988 | Stokes |
| 4,761,590 A | 8/1988 | Kaszman |
| 4,792,712 A | 12/1988 | Stokes |
| 4,801,244 A | 1/1989 | Stahl |
| 4,866,321 A | 9/1989 | Blanchard et al. |
| 4,900,965 A | 2/1990 | Fisher |
| 4,906,060 A | 3/1990 | Claude |
| 4,973,868 A | 11/1990 | Wust |
| 4,976,587 A | 12/1990 | Johnston et al. |
| 5,004,944 A | 4/1991 | Fisher |
| 5,063,318 A | 11/1991 | Anderson |
| 5,090,711 A | 2/1992 | Becker |
| 5,091,668 A | 2/1992 | Cuenot et al. |
| 5,177,388 A | 1/1993 | Hotta et al. |
| 5,191,255 A | 3/1993 | Kloosterhouse et al. |
| 5,275,139 A | 1/1994 | Rosenquist |
| 5,280,209 A | 1/1994 | Leupold et al. |
| 5,281,094 A | 1/1994 | McCarty et al. |
| 5,298,827 A | 3/1994 | Sugiyama |
| 5,302,876 A | 4/1994 | Iwamatsu et al. |
| 5,311,092 A | 5/1994 | Fisher |
| 5,315,159 A | 5/1994 | Gribnau |
| 5,331,238 A | 7/1994 | Johnsen |
| 5,410,997 A | 5/1995 | Rosenquist |
| 5,419,683 A | 5/1995 | Peace |
| 5,456,579 A | 10/1995 | Olson |
| 5,483,116 A | 1/1996 | Kusase et al. |
| 5,506,453 A | 4/1996 | McCombs |
| 5,579,800 A | 12/1996 | Walker |
| 5,609,184 A | 3/1997 | Apel et al. |
| 5,663,600 A | 9/1997 | Baek et al. |
| 5,670,838 A | 9/1997 | Everton |
| 5,696,419 A | 12/1997 | Rakestraw et al. |
| 5,704,567 A | 1/1998 | Maglieri |
| 5,746,576 A | 5/1998 | Bayly |
| 5,777,952 A | 7/1998 | Nishimura et al. |
| 5,783,894 A | 7/1998 | Wither |
| 5,793,144 A | 8/1998 | Kusase et al. |
| 5,798,632 A | 8/1998 | Muljadi |
| 5,801,470 A | 9/1998 | Johnson et al. |
| 5,811,908 A | 9/1998 | Iwata et al. |
| 5,814,914 A | 9/1998 | Caamaño |
| 5,844,333 A | 12/1998 | Sheerin |
| 5,844,341 A | 12/1998 | Spooner et al. |
| 5,857,762 A | 1/1999 | Schwaller |
| 5,886,441 A | 3/1999 | Uchida et al. |
| 5,889,346 A | 3/1999 | Uchida et al. |
| 5,894,183 A | 4/1999 | Borchert |
| 5,925,964 A | 7/1999 | Kusase et al. |
| 5,952,755 A | 9/1999 | Lubas |
| 5,961,124 A | 10/1999 | Muller |
| 5,973,435 A | 10/1999 | Irie et al. |
| 5,986,374 A | 11/1999 | Kawakami |
| 5,986,378 A | 11/1999 | Caamaño |
| 6,013,968 A | 1/2000 | Lechner et al. |
| 6,037,692 A | 3/2000 | Miekka et al. |
| 6,064,123 A | 5/2000 | Gislason |
| 6,067,227 A | 5/2000 | Katsui et al. |
| 6,089,536 A | 7/2000 | Watanabe et al. |
| 6,093,984 A | 7/2000 | Shiga et al. |
| 6,127,739 A | 10/2000 | Appa |
| 6,172,429 B1 | 1/2001 | Russell |
| 6,177,746 B1 | 1/2001 | Tupper et al. |
| 6,193,211 B1 | 2/2001 | Watanabe et al. |
| 6,194,799 B1 | 2/2001 | Miekka et al. |
| 6,215,199 B1 | 4/2001 | Lysenko et al. |
| 6,232,673 B1 | 5/2001 | Schoo et al. |
| 6,278,197 B1 | 8/2001 | Appa |
| 6,285,090 B1 | 9/2001 | Brutsaert et al. |
| 6,326,711 B1 | 12/2001 | Yamaguchi et al. |
| 6,365,994 B1 | 4/2002 | Watanabe et al. |
| 6,373,160 B1 | 4/2002 | Schrödl |
| 6,376,956 B1 | 4/2002 | Hosoya |
| 6,378,839 B2 | 4/2002 | Watanabe et al. |
| 6,384,504 B1 | 5/2002 | Ehrhart et al. |
| 6,417,578 B1 | 7/2002 | Chapman et al. |
| 6,428,011 B1 | 8/2002 | Oskouei |
| 6,452,287 B1 | 9/2002 | Looker |
| 6,452,301 B1 | 9/2002 | Van Dine et al. |
| 6,455,976 B1 | 9/2002 | Nakano |
| 6,472,784 B2 | 10/2002 | Miekka et al. |
| 6,474,653 B1 | 11/2002 | Hintenlang et al. |
| 6,476,513 B1 | 11/2002 | Gueorguiev |
| 6,483,199 B2 | 11/2002 | Umemoto et al. |
| 6,492,743 B1 | 12/2002 | Appa |
| 6,492,754 B1 | 12/2002 | Weiglhofer et al. |
| 6,499,532 B1 | 12/2002 | Williams |
| 6,504,260 B1 | 1/2003 | Debleser |
| 6,515,390 B1 | 2/2003 | Lopatinsky et al. |
| 6,520,737 B1 | 2/2003 | Fischer et al. |
| 6,548,932 B1 | 4/2003 | Weiglhofer et al. |
| 6,590,312 B1 | 7/2003 | Seguchi et al. |
| 6,603,232 B2 | 8/2003 | Van Dine et al. |
| 6,617,747 B1 | 9/2003 | Petersen |
| 6,629,358 B2 | 10/2003 | Setiabudi et al. |
| 6,664,692 B1 | 12/2003 | Kristoffersen |
| 6,676,122 B1 | 1/2004 | Wobben |
| 6,683,397 B2 | 1/2004 | Gauthier et al. |
| 6,700,260 B2 | 3/2004 | Hsu et al. |
| 6,700,288 B2 | 3/2004 | Smith |
| 6,707,224 B1 | 3/2004 | Petersen |
| 6,713,891 B2 * | 3/2004 | Kirkegaard et al. ............ 290/44 |
| 6,720,688 B1 | 4/2004 | Schiller |
| 6,727,624 B2 | 4/2004 | Morita et al. |
| 6,746,217 B2 | 6/2004 | Kim et al. |
| 6,759,758 B2 | 7/2004 | Torres Martinez |
| 6,762,525 B1 | 7/2004 | Maslov et al. |
| 6,781,276 B1 | 8/2004 | Stiesdal et al. |
| 6,784,564 B1 | 8/2004 | Wobben |
| 6,794,781 B2 | 9/2004 | Razzell et al. |
| 6,828,710 B1 | 12/2004 | Gabrys |
| 6,856,042 B1 | 2/2005 | Kubota |
| 6,879,075 B2 | 4/2005 | Calfo et al. |

| | | | |
|---|---|---|---|
| 6,888,262 B2 | 5/2005 | Blakemore |
| 6,891,299 B2 | 5/2005 | Coupart et al. |
| 6,903,466 B1 | 6/2005 | Mercier et al. |
| 6,903,475 B2 | 6/2005 | Ortt et al. |
| 6,906,444 B2 | 6/2005 | Hattori et al. |
| 6,911,741 B2 | 6/2005 | Petteersen et al. |
| 6,921,243 B2 | 7/2005 | Canini et al. |
| 6,931,834 B2 | 8/2005 | Jones |
| 6,933,645 B1 | 8/2005 | Watson |
| 6,933,646 B2 | 8/2005 | Kinoshita |
| 6,942,454 B2 | 9/2005 | Ohlmann |
| 6,945,747 B1 | 9/2005 | Miller |
| 6,949,860 B2 | 9/2005 | Hama et al. |
| 6,951,443 B1 | 10/2005 | Blakemore |
| 6,972,498 B2 | 12/2005 | Jamieson et al. |
| 6,983,529 B2 | 1/2006 | Ortt et al. |
| 6,984,908 B2 | 1/2006 | Rinholm et al. |
| 6,987,342 B2 | 1/2006 | Hans |
| 6,998,729 B1 | 2/2006 | Wobben |
| 7,004,724 B2 | 2/2006 | Pierce et al. |
| 7,008,172 B2 | 3/2006 | Selsam |
| 7,008,348 B2 | 3/2006 | LaBath |
| 7,016,006 B2 | 3/2006 | Song |
| 7,021,905 B2 | 4/2006 | Torrey et al. |
| 7,028,386 B2 | 4/2006 | Kato et al. |
| 7,033,139 B2 | 4/2006 | Wobben |
| 7,038,343 B2 | 5/2006 | Agnes et al. |
| 7,042,109 B2 | 5/2006 | Gabrys |
| 7,057,305 B2 | 6/2006 | Krüger-Gotzmann et al. |
| 7,075,192 B2 | 7/2006 | Bywaters et al. |
| 7,081,696 B2 | 7/2006 | Ritchey |
| 7,088,024 B2 | 8/2006 | Agnes et al. |
| 7,091,642 B2 | 8/2006 | Agnes et al. |
| 7,095,128 B2 | 8/2006 | Canini et al. |
| 7,098,552 B2 | 8/2006 | McCoin |
| 7,109,600 B1 | 9/2006 | Bywaters et al. |
| 7,111,668 B2 | 9/2006 | Rürup |
| 7,116,006 B2 | 10/2006 | McCoin |
| 7,119,469 B2 | 10/2006 | Ortt et al. |
| 7,154,191 B2 | 12/2006 | Jansen et al. |
| 7,161,260 B2 | 1/2007 | Krüger-Gotzmann et al. |
| 7,166,942 B2 | 1/2007 | Yokota |
| 7,168,248 B2 | 1/2007 | Sakamoto et al. |
| 7,168,251 B1 | 1/2007 | Janssen |
| 7,179,056 B2 | 2/2007 | Sieffriedsen |
| 7,180,204 B2 | 2/2007 | Grant et al. |
| 7,183,665 B2 | 2/2007 | Bywaters et al. |
| 7,196,446 B2 | 3/2007 | Hans |
| 7,199,485 B2 * | 4/2007 | Wobben ............................ 290/55 |
| 7,205,678 B2 | 4/2007 | Casazza et al. |
| 7,217,091 B2 | 5/2007 | LeMieux |
| 7,259,472 B2 | 8/2007 | Miyake et al. |
| 7,281,501 B2 | 10/2007 | Leufen et al. |
| 7,285,890 B2 | 10/2007 | Jones et al. |
| 7,323,792 B2 | 1/2008 | Sohn |
| 7,345,376 B2 | 3/2008 | Costin |
| 7,358,637 B2 | 4/2008 | Tapper |
| 7,377,163 B2 | 5/2008 | Miyagawa |
| 7,385,305 B2 | 6/2008 | Casazza et al. |
| 7,385,306 B2 | 6/2008 | Casazza et al. |
| 7,392,988 B2 | 7/2008 | Moldt et al. |
| 7,427,814 B2 | 9/2008 | Bagepalli et al. |
| 7,431,567 B1 | 10/2008 | Bevington et al. |
| 7,443,066 B2 | 10/2008 | Salamah et al. |
| 7,458,261 B2 | 12/2008 | Miyagawa |
| 7,482,720 B2 | 1/2009 | Gordon et al. |
| 7,548,008 B2 | 6/2009 | Jansen et al. |
| 7,550,863 B2 | 6/2009 | Versteegh |
| 7,687,932 B2 | 3/2010 | Casazza et al. |
| 2002/0047418 A1 | 4/2002 | Seguchi et al. |
| 2002/0047425 A1 | 4/2002 | Coupart et al. |
| 2002/0056822 A1 | 5/2002 | Watanabe et al. |
| 2002/0063485 A1 | 5/2002 | Lee et al. |
| 2002/0089251 A1 | 7/2002 | Tajima et al. |
| 2002/0148453 A1 | 10/2002 | Watanabe et al. |
| 2003/0011266 A1 | 1/2003 | Morita et al. |
| 2003/0102677 A1 | 6/2003 | Becker et al. |
| 2003/0137149 A1 | 7/2003 | Northrup et al. |
| 2003/0230899 A1 | 12/2003 | Torres Martinez |
| 2004/0086373 A1 | 5/2004 | Page, Jr. |
| 2004/0094965 A1 | 5/2004 | Kirkegaard et al. |
| 2004/0119292 A1 | 6/2004 | Datta et al. |
| 2004/0150283 A1 | 8/2004 | Calfo et al. |
| 2004/0151575 A1 | 8/2004 | Pierce et al. |
| 2004/0151577 A1 | 8/2004 | Pierce et al. |
| 2004/0189136 A1 | 9/2004 | Kolomeitsev et al. |
| 2005/0002783 A1 | 1/2005 | Hiel et al. |
| 2005/0002787 A1 | 1/2005 | Wobben |
| 2005/0082839 A1 | 4/2005 | McCoin |
| 2005/0230979 A1 | 10/2005 | Bywaters et al. |
| 2005/0280264 A1 | 12/2005 | Nagy |
| 2006/0000269 A1 | 1/2006 | LeMieux et al. |
| 2006/0001269 A1 | 1/2006 | Jansen et al. |
| 2006/0006658 A1 | 1/2006 | McCoin |
| 2006/0012182 A1 | 1/2006 | McCoin |
| 2006/0028025 A1 | 2/2006 | Kikuchi et al. |
| 2006/0066110 A1 | 3/2006 | Jansen et al. |
| 2006/0071575 A1 | 4/2006 | Jansen et al. |
| 2006/0091735 A1 | 5/2006 | Song et al. |
| 2006/0125243 A1 | 6/2006 | Miller |
| 2006/0131985 A1 | 6/2006 | Qu et al. |
| 2006/0152012 A1 | 7/2006 | Wiegel et al. |
| 2006/0152015 A1 | 7/2006 | Bywaters et al. |
| 2006/0152016 A1 | 7/2006 | Bywaters et al. |
| 2007/0020109 A1 | 1/2007 | Takahashi et al. |
| 2007/0116567 A1 | 5/2007 | Luetze |
| 2007/0187954 A1 | 8/2007 | Struve et al. |
| 2007/0187956 A1 | 8/2007 | Wobben |
| 2007/0222223 A1 | 9/2007 | Bagepalli et al. |
| 2007/0222226 A1 | 9/2007 | Casazza et al. |
| 2007/0222227 A1 | 9/2007 | Casazza et al. |
| 2008/0003105 A1 | 1/2008 | Nies |
| 2008/0025847 A1 | 1/2008 | Teipen |
| 2008/0050234 A1 | 2/2008 | Ingersoll et al. |
| 2008/0107526 A1 | 5/2008 | Wobben |
| 2008/0118342 A1 | 5/2008 | Seidel et al. |
| 2008/0197636 A1 | 8/2008 | Tilscher et al. |
| 2008/0197638 A1 | 8/2008 | Wobben |
| 2008/0246224 A1 | 10/2008 | Pabst et al. |
| 2008/0290664 A1 | 11/2008 | Kruger |
| 2008/0303281 A1 | 12/2008 | Krueger |
| 2008/0309189 A1 | 12/2008 | Pabst et al. |
| 2008/0315594 A1 | 12/2008 | Casazza et al. |
| 2009/0045628 A1 | 2/2009 | Erdman et al. |
| 2009/0060748 A1 | 3/2009 | Landa et al. |
| 2009/0094981 A1 | 4/2009 | Eggleston |
| 2009/0096309 A1 | 4/2009 | Pabst et al. |
| 2009/0206610 A1 * | 8/2009 | Martin et al. .................... 290/55 |
| 2009/0302702 A1 | 12/2009 | Pabst et al. |
| 2010/0006710 A1 * | 1/2010 | Lyness et al. .................... 248/70 |
| 2010/0019502 A1 | 1/2010 | Pabst et al. |
| 2010/0026010 A1 | 2/2010 | Pabst |
| 2010/0117362 A1 | 5/2010 | Vihriala et al. |
| 2010/0123318 A1 | 5/2010 | Casazza et al. |

FOREIGN PATENT DOCUMENTS

| | | |
|---|---|---|
| CA | 2518742 | 9/2004 |
| CA | 2 669 371 | 12/2009 |
| CN | 1554867 | 12/2004 |
| DE | 1130913 | 6/1962 |
| DE | 2164135 | 7/1973 |
| DE | 2322458 | 11/1974 |
| DE | 2506160 | 8/1976 |
| DE | 2922885 | 12/1980 |
| DE | 3638129 | 5/1988 |
| DE | 3718954 | 12/1988 |
| DE | 3844505 | 7/1990 |
| DE | 3903399 | 8/1990 |
| DE | 4304577 | 8/1994 |
| DE | 4402184 | 8/1995 |
| DE | 4415570 | 11/1995 |
| DE | 4444757 | 6/1996 |
| DE | 29706980 | 7/1997 |
| DE | 19636591 | 3/1998 |
| DE | 19644355 | 4/1998 |
| DE | 19652673 | 6/1998 |
| DE | 19711869 | 9/1998 |
| DE | 19748716 | 11/1998 |

| | | |
|---|---|---|
| DE | 29819391 | 2/1999 |
| DE | 19801803 | 4/1999 |
| DE | 19932394 | 1/2001 |
| DE | 19947915 | 4/2001 |
| DE | 19951594 | 5/2001 |
| DE | 10000370 | 7/2001 |
| DE | 20102029 | 8/2001 |
| DE | 10219190 | 11/2003 |
| DE | 10246690 | 4/2004 |
| DE | 102004018524 | 11/2005 |
| DE | 102004028746 | 12/2005 |
| EP | 0013157 | 7/1980 |
| EP | 0232963 | 8/1987 |
| EP | 0313392 | 4/1989 |
| EP | 0627805 | 12/1994 |
| EP | 1108888 | 6/2001 |
| EP | 1167754 | 1/2002 |
| EP | 1289097 | 3/2003 |
| EP | 1291521 | 3/2003 |
| EP | 1309067 | 5/2003 |
| EP | 1363019 | 11/2003 |
| EP | 1375913 | 1/2004 |
| EP | 1394406 | 3/2004 |
| EP | 1394451 | 3/2004 |
| EP | 1589222 | 10/2005 |
| EP | 1612415 | 1/2006 |
| EP | 1641102 | 3/2006 |
| EP | 1677002 | 7/2006 |
| EP | 1772624 | 4/2007 |
| EP | 1780409 | 5/2007 |
| EP | 1829762 | 9/2007 |
| EP | 1 921 311 | 5/2008 |
| EP | 2060786 | 5/2009 |
| ES | 2140301 | 2/2000 |
| FR | 806292 | 12/1936 |
| FR | 859844 | 12/1940 |
| FR | 1348765 | 1/1964 |
| FR | 2401091 | 3/1979 |
| FR | 2445053 | 7/1980 |
| FR | 2519483 | 7/1983 |
| FR | 2594272 | 8/1987 |
| FR | 2760492 | 9/1998 |
| FR | 2796671 | 1/2001 |
| FR | 2798168 | 3/2001 |
| FR | 2810374 | 12/2001 |
| FR | 2882404 | 8/2006 |
| GB | 191317268 | 0/1914 |
| GB | 859176 | 1/1961 |
| GB | 1524477 | 9/1978 |
| GB | 1537729 | 1/1979 |
| GB | 2041111 | 9/1980 |
| GB | 2050525 | 1/1981 |
| GB | 2075274 | 11/1981 |
| GB | 2131630 | 6/1984 |
| GB | 2144587 | 3/1985 |
| GB | 2208243 | 3/1989 |
| GB | 2266937 | 11/1993 |
| GB | 2372783 | 9/2002 |
| JP | 57059462 | 4/1982 |
| JP | 3145945 | 6/1991 |
| JP | 5122912 | 5/1993 |
| JP | 6002970 | 1/1994 |
| JP | 6269141 | 9/1994 |
| JP | 10-070858 | 3/1998 |
| JP | 11236977 | 8/1999 |
| JP | 11-299197 | 10/1999 |
| JP | 2000-134885 | 5/2000 |
| JP | 2001-057750 | 2/2001 |
| JP | 2003453072 | 7/2003 |
| JP | 2004-153913 | 5/2004 |
| JP | 2004-297947 | 10/2004 |
| JP | 2005-006375 | 1/2005 |
| JP | 2005-020906 | 1/2005 |
| JP | 2005-312150 | 11/2005 |
| NL | 8902534 | 5/1991 |
| RU | 2000466 | 9/1993 |
| RU | 2229621 | 5/2004 |
| WO | WO8402382 | 6/1984 |
| WO | WO9105953 | 5/1991 |
| WO | WO9212343 | 7/1992 |
| WO | WO9730504 | 8/1997 |
| WO | WO9733357 | 9/1997 |
| WO | WO9840627 | 9/1998 |
| WO | WO9930031 | 6/1999 |
| WO | WO9933165 | 7/1999 |
| WO | WO9937912 | 7/1999 |
| WO | WO9939426 | 8/1999 |
| WO | WO0001056 | 1/2000 |
| WO | WO0106121 | 1/2001 |
| WO | WO0106623 | 1/2001 |
| WO | WO0107784 | 2/2001 |
| WO | WO0121956 | 3/2001 |
| WO | WO0125631 | 4/2001 |
| WO | WO0129413 | 4/2001 |
| WO | WO0134973 | 5/2001 |
| WO | WO0135517 | 5/2001 |
| WO | WO01069754 | 9/2001 |
| WO | WO0233254 | 4/2002 |
| WO | WO02057624 | 7/2002 |
| WO | WO02083523 | 10/2002 |
| WO | WO 03/036084 | 5/2003 |
| WO | WO03067081 | 8/2003 |
| WO | WO03076801 | 9/2003 |
| WO | WO2004017497 | 2/2004 |
| WO | WO2005103489 | 11/2005 |
| WO | WO2006013722 | 2/2006 |
| WO | WO2006032515 | 3/2006 |
| WO | WO2007063370 | 6/2007 |
| WO | WO2007110718 | 10/2007 |
| WO | WO2008052562 | 5/2008 |
| WO | WO2008078342 | 7/2008 |
| WO | WO2008086608 | 7/2008 |
| WO | WO2008098573 | 8/2008 |
| WO | WO2008102184 | 8/2008 |
| WO | Wo2008116463 | 10/2008 |
| WO | WO2008131766 | 11/2008 |

OTHER PUBLICATIONS

Variable Speed Gearless Wind Turbine (website), http://www.mhi.cojp/msmw/mw/en/gearless.html, viewed on Sep. 22, 2006.

Italian Search Report from corresponding foreign application dated Feb. 22, 2010.

* cited by examiner

WIND POWER TURBINE INCLUDING A CABLE BUNDLE GUIDE DEVICE

PRIORITY CLAIM

This application claims the benefit of and priority to Italian Patent Application No. MI2009A 000572, filed on Apr. 9, 2009, the entire contents of which are incorporated herein.

BACKGROUND

Known nacelles of wind power turbines define a compartment housing many of the control and actuating devices of the wind power turbine. The blade assembly comprises a hub; and a number of blades adjustable with respect to the hub about their longitudinal axes, to adjust the pitch of the blades. The nacelle also houses the blade pitch adjustment actuating and control devices. The nacelle of some known wind power turbines is also designed to house frequency converters and transformers. Modern wind power turbines have pylons ranging between 60 meters (196.85 feet) and 120 meters (393.7 feet) in height. So, to carry out the necessary maintenance of the actuating and control devices, the mechanical parts of the nacelle, and the instruments inside it, easy access by maintenance workers to the inside of the nacelle is of vital importance. At present, wind power turbines are normally equipped with service ladders inside the pylon, and with a winch inside the wind power turbine for hoisting heavy, bulky material; and small parts are sometimes carried by workers in backpacks.

Climbing up and down ladders, possibly several times a shift and carrying backpacks, is very tiring, uneconomical, and at times even dangerous.

For this reason, many known wind power turbines are equipped with a lift, housed inside the pylon and movable along a first axis, for carrying two or three workers, tools, instruments, and medium-sized spare parts, and which connects the bottom end of the pylon to a panoramic platform fixed to the pylon, beneath the nacelle, and of the type described in U.S. Pat. No. 6,998,729 B1.

Known lifts, however, stop well below the nacelle, which means the last part of the ascent to the nacelle must be made by ladder, with all the drawbacks referred to above.

The reason the lift stops short of the top of the pylon is because of the cable bundle, which is normally wound into a ring underneath the nacelle, to allow the nacelle to rotate with respect to the pylon without stressing the cables. And since the nacelle is normally designed to make two and a half turns with respect to the pylon, the ring formed by the cable bundle underneath the nacelle is relatively large and normally hinders access to the nacelle.

SUMMARY

The present disclosure relates to a wind power turbine for producing electric energy.

More specifically, the present disclosure relates to a wind power turbine comprising a pylon extending from a bottom end to a top end; a nacelle fitted to the top end of the pylon to rotate about a first axis; an electric generator fitted to the nacelle to produce electric energy; a blade assembly, which rotates with respect to the nacelle about a second axis; and an electric cable bundle extending from the electric generator to transfer electric energy between the nacelle and a point inside the pylon, such as at the bottom end of the pylon.

Accordingly, it is an object of the present disclosure to provide a wind power turbine designed to eliminate the drawbacks of the known art.

Another object of the present disclosure is to provide a wind power turbine affording more space as compared with known wind power turbines.

According to the present disclosure, there is provided a wind power turbine for producing electric energy, the wind power turbine comprising a pylon extending from a bottom end to a top end; a nacelle fitted to the top end of the pylon to rotate about a first axis; an electric generator fitted to the nacelle to produce electric energy; a blade assembly, which rotates with respect to the nacelle about a second axis; an electric cable bundle extending from the electric generator to a point inside the pylon, such as at the bottom end of the pylon; and a guide device for guiding the cable bundle; the guide device being connected to the cable bundle, and being configured to divert the cable bundle radially from a point close to the first axis, to a point well or substantially away from the first axis, and to rotate the cable bundle.

The present disclosure thus provides for greatly reducing hindrance by the cables, by the guide device guiding the cables in orderly fashion, without impairing rotation of the nacelle with respect to the pylon, and without subjecting individual cables to torsional stress along the guide device.

Additional features and advantages are described in, and will be apparent from, the following Detailed Description and the figures.

BRIEF DESCRIPTION OF THE DRAWINGS

A non-limiting embodiment of the present disclosure will be described by way of example with reference to the accompanying drawings, in which.

DETAILED DESCRIPTION

Figure 1:
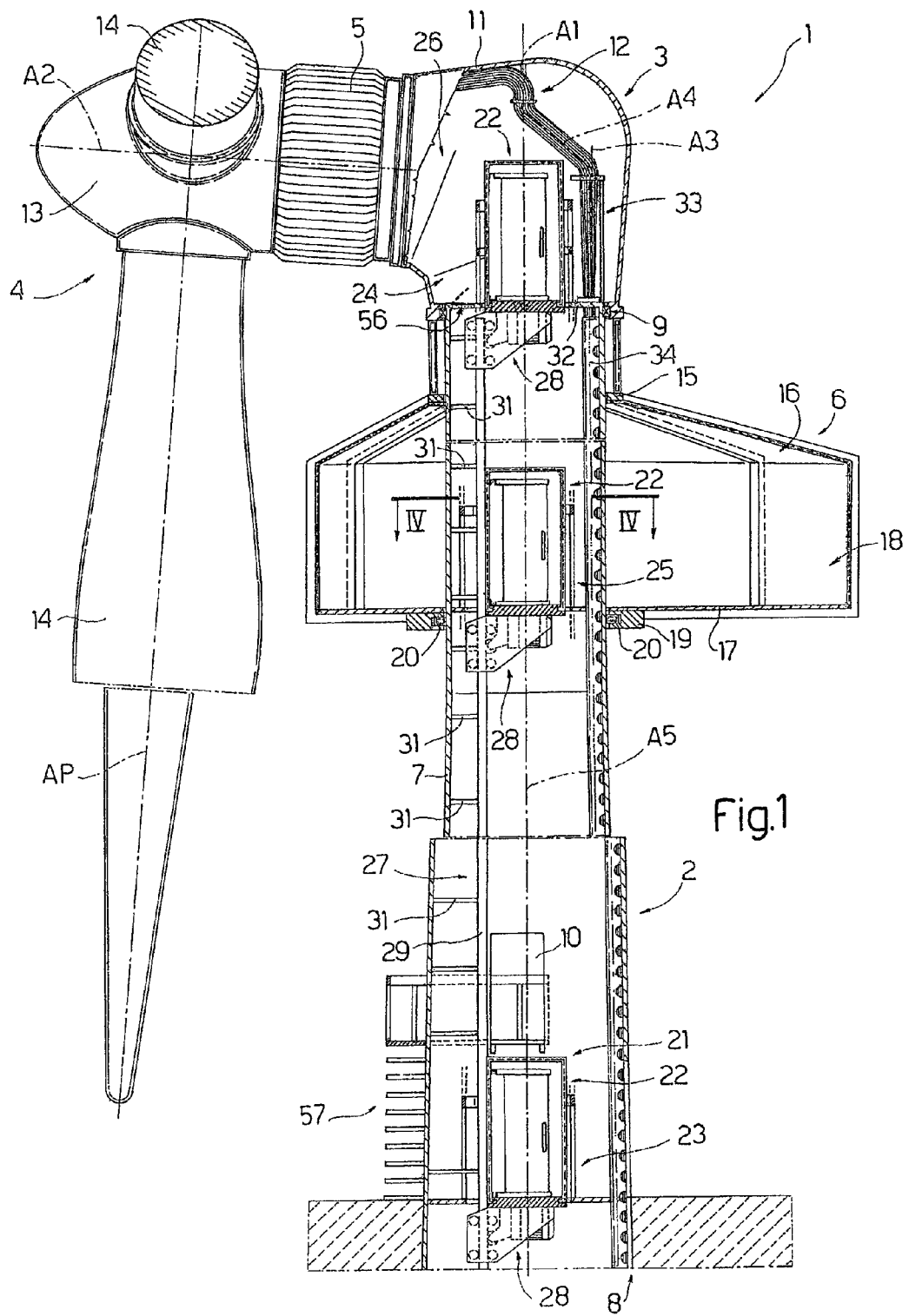
FIG. 1 shows a partly sectioned side view, with parts removed for clarity, of a wind power turbine in accordance with the present disclosure.

Referring now to the example embodiments of the present disclosure illustrated in FIGS. 1 to 6, number 1 in FIG. 1 indicates as a whole a wind power turbine, which comprises a pylon 2 extending along a vertical axis A1 between a bottom end and a top end; a nacelle 3 fitted to the top end of pylon 2 and rotatable with respect to pylon 2 about axis A1; a blade assembly 4 mounted to rotate with respect to nacelle 3 about an axis A2 crosswise to axis A1; an electric generator 5 fitted to nacelle 3; and a panoramic platform 6 along pylon 2.

Pylon 2 is substantially defined by a truncated-cone-shaped wall 7 fixed to a foundation structure 8 and fitted at the top with a thrust bearing 9, on which nacelle 3 is mounted. An actuating device (not shown) at thrust bearing 9 selectively orients nacelle 3 about axis A1, as wind power turbine 1 is running, to position nacelle 3 and blade assembly 4 upwind and optimize performance of wind power turbine 1.

Pylon 2 has access openings formed in wall 7 and closed by doors 10, only one of which is shown in FIG. 1.

Nacelle 3 is substantially in the form of a tubular elbow, extends partly along axis A1 and partly along axis A2, is substantially defined by a wall 11, and houses actuators and component parts (not shown).

Wind power turbine 1 comprises a cable bundle 12 connecting nacelle 3 to the bottom end of pylon 2, and which, in the example shown, connects electric generator 5 to a transformer (not shown) at the bottom end of pylon 2.

Blade assembly 4 comprises a hollow hub 13; and three blades 14 (only one shown in FIG. 1), each mounted to rotate about hub 13 and extending along a respective axis AP. Adjustment of blades 14 about respective axes AP, known as pitch control, is made by an actuating device (not shown) housed inside hub 13.

Electric generator 5 is fitted to and projects from nacelle 3, extends about axis A2, and, in the example shown, is a permanent-magnet, synchronous generator with a hollow rotor connected directly to hub 13 by a sleeve (not shown). This structure also allows access by workers, through nacelle 3 and the sleeve, to the instruments and construction parts inside hub 13.

Panoramic platform 6 comprises a supporting frame 15, a roof 16, a floor 17, and windows 18. Frame 15 is fixed to, more specifically is suspended from, nacelle 3, extends about pylon 2, beneath nacelle 3, and comprises a bottom ring 19, which supports wheels 20 contacting wall 7 of pylon 9, and rotates about pylon 2 together with nacelle 3.

Figure 4:
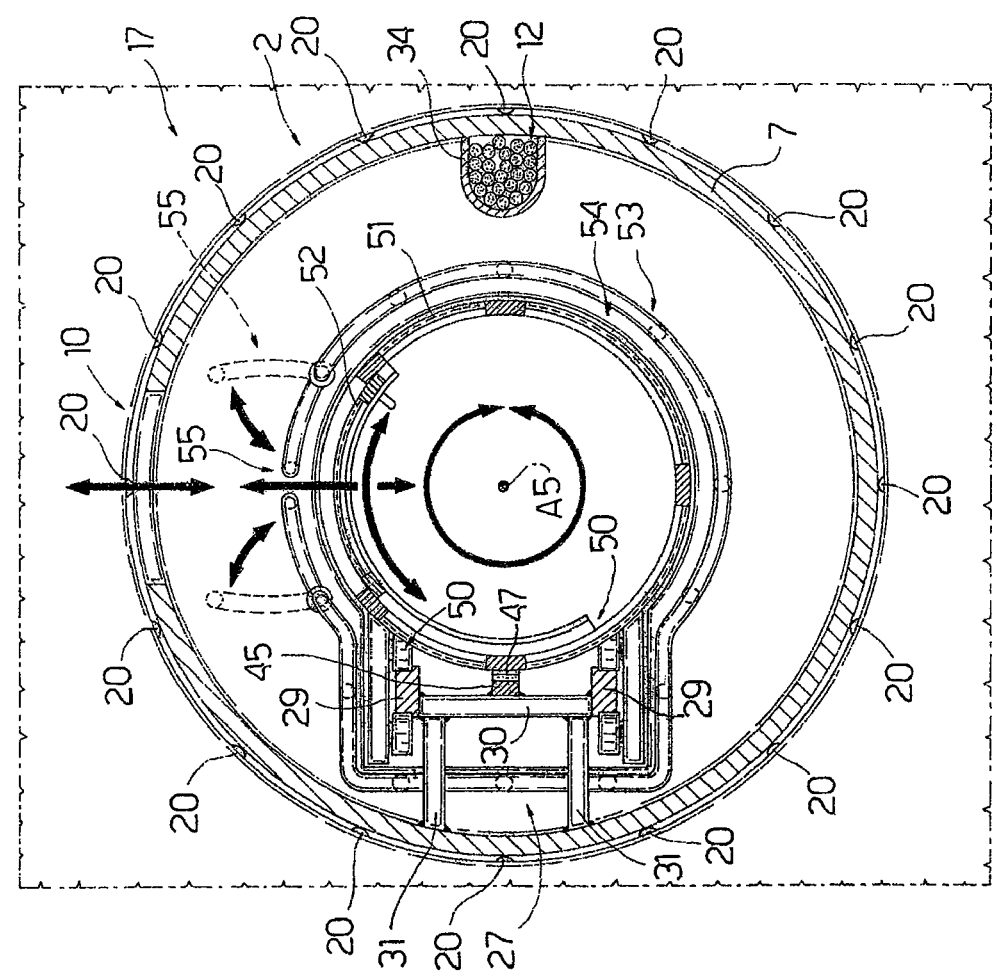
FIG. 4 shows a section, with parts removed for clarity, along line IV-IV of the FIG. 1 wind power turbine.

Access to panoramic platform 6 is through the door 10 in wall 7 of pylon 2, as shown in FIG. 4.

Panoramic platform 6 is asymmetrical with respect to axis A1. That is, the radial extension of panoramic platform 6 is greater on the opposite side to blades 14 than on the side facing blades 14.

Wind power turbine 1 also comprises a lift 21 for carrying workers and spare parts between the bottom end of pylon 2 and nacelle 3, or visitors between the bottom end of pylon 2 and panoramic platform 6.

With reference to FIG. 1, lift 21 comprises an elevator car 22 movable, along axis A1, between a first station 23 at the bottom end of pylon 2, and a second station 24 at the top of pylon 2. In the FIG. 1 example, lift 21 also comprises an intermediate station 25 at panoramic platform 6. For illustration purposes, FIG. 1 shows three elevator cars 22 at respective stations 23, 24, 25, it being understood, however, that the example embodiment described comprises only one elevator car 22.

More specifically, second station 24 of lift 21 is located inside nacelle 3, which has a compartment 26 designed to house elevator car 22 at second station 24, regardless of the angular position of nacelle 3 about axis A1 and with respect to pylon 2.

Lift 21 comprises a guide 27 located inside and fixed to pylon 2, and extending along axis A1; and a carriage 28 fitted to guide 27 along axis A1. More specifically, guide 27 is contained within pylon 2, and car 22 is mounted on top of carriage 28 so that, at second station 24, elevator car 22 is located inside nacelle 3, and carriage 28 inside pylon 2.

As shown more clearly in FIG. 4, guide 27 comprises two rails 29 parallel to axis A1; and a succession of rungs 30 crosswise and connecting rails 29, and in turn connected to wall 7 of pylon 2 by spacers 31. Rails 29 and rungs 30 thus define an emergency ladder for use in the event of a malfunction of lift 21.

With reference to FIG. 1, lift 21 comprises an actuating device (not shown) controllable from elevator car 22, first station 23, intermediate station 25, and second station 24.

Pylon 2 comprises an annular plate 32 located at the top end of pylon 2 and defining a walkway of compartment 26.

Wind power turbine 1 comprises a guide device 33 for guiding cable bundle 12 and located inside compartment 26; and a raceway 34 fixed to wall 7 of pylon 2 to protect and guide cable bundle 12 inside pylon 2.

Figure 5:
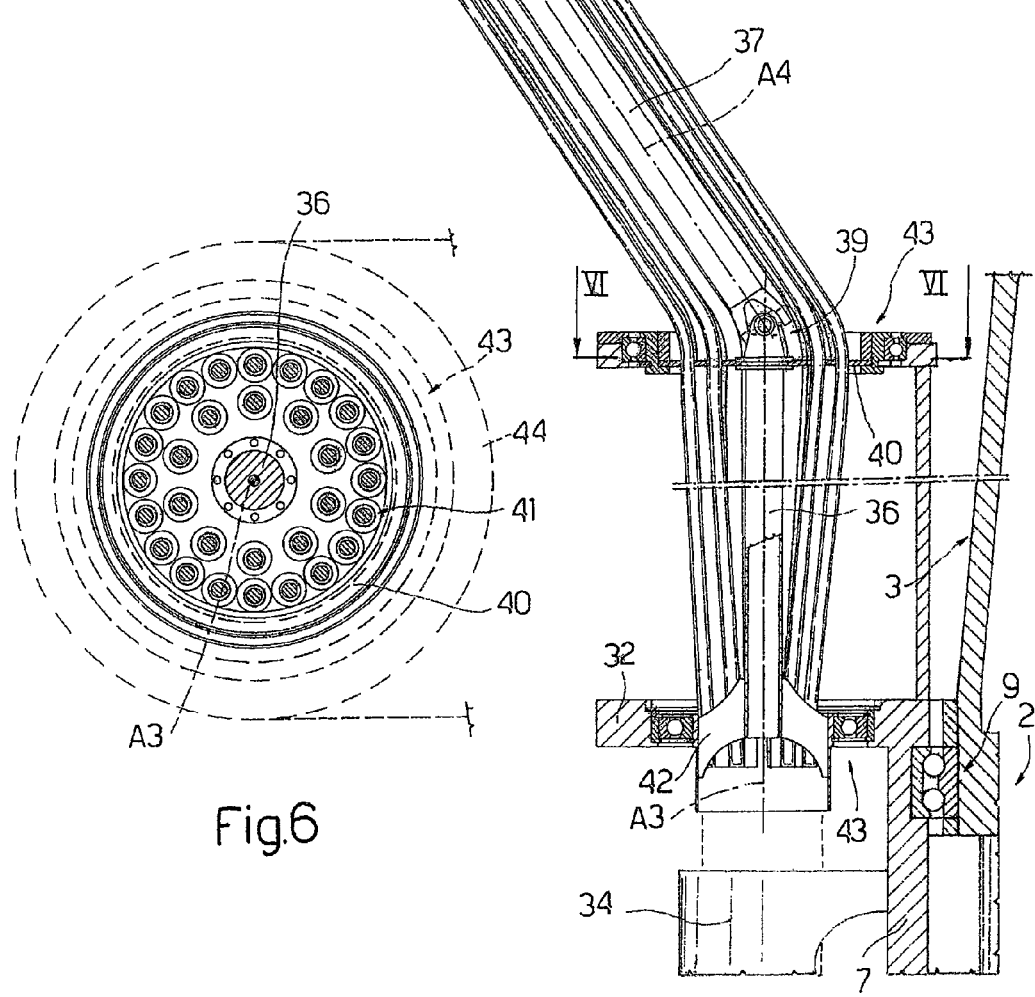
FIG. 5 shows a partly sectioned side view, with parts removed for clarity, of a guide device of the FIG. 1 wind power turbine.

With reference to FIG. 5, cable bundle 12 is fitted to guide device 33, which comprises a shaft 35 integral with nacelle 3 and of axis A1; a shaft 36 extending along an axis A3 parallel to axis A1; and a shaft 37, which extends along an axis A4 sloping with respect to axes A1 and A3, and is connected to shafts 35 and 36 by respective universal joints 38 and 39.

Figure 6:
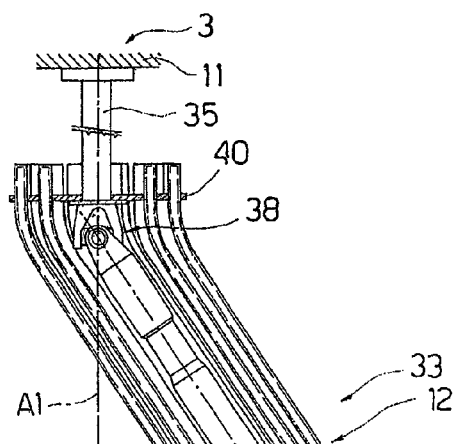
FIG. 6 shows a partly sectioned, larger-scale section, with parts removed for clarity, along line VI-VI of the FIG. 5 guide device.

Shaft 36 comprises a member 40, next to universal joint 39, connecting cable bundle 12 integral with shaft 36, and which, as shown in FIG. 6, is defined by a plate with a number of holes 41, each engaged by a respective cable of cable bundle 12.

Shaft 35 comprises an identical member 40, next to universal joint 38, for connecting cable bundle 12 integral with shaft 35.

Shaft 36 also comprises a flange 42 integral with shaft 36 and fitted to pylon 2 with the interposition of a bearing 43. In one embodiment, member 40 of shaft 36 is also connected to pylon 2 with the interposition of a bearing 43 and of a structure 44 fixed to pylon 2.

As nacelle 3 rotates about axis A1 with respect to pylon 2, shafts 35, 36, 37 rotate about respective axes A1, A3, A4, so cable bundle 12 also rotates about axis A3 and twists inside raceway 34. The height of pylon 2, however, prevents the twisting from severely stressing the cables.

Guide device 33 is substantially defined by an elongated member, which comprises shafts 35, 36, 37, is articulated to extend along a designated guide path, and is fitted to cable bundle 12. One end of the elongated member is fixed to nacelle 3 to rotate together with nacelle 3 and cable bundle 12, and the other end of the elongated member is fitted in rotary manner to pylon 2.

As shown in FIG. 1, it is thus possible to divert cable bundle 12 radially from a point close to axis A1, to a point well away from axis A1 and adjacent to wall 7 of pylon 2; to allow rotation of nacelle 3 with respect to pylon 2, without severely stressing cable bundle 12; and to greatly increase the space inside compartment 26 in nacelle 3, and inside the top of pylon 2. Guide device 33 thus enables compartment 26 in nacelle 3 to accommodate car 22.

Rotation of cable bundle 12 about the elongated member, in fact, produces no torsional stress on individual cables, at least where the cable bundle is connected to the elongated member. Twisting of individual cables in cable bundle 12 occurs inside raceway 34, and is distributed over such a long length as not to impair the integrity of the cables.

Figure 2:
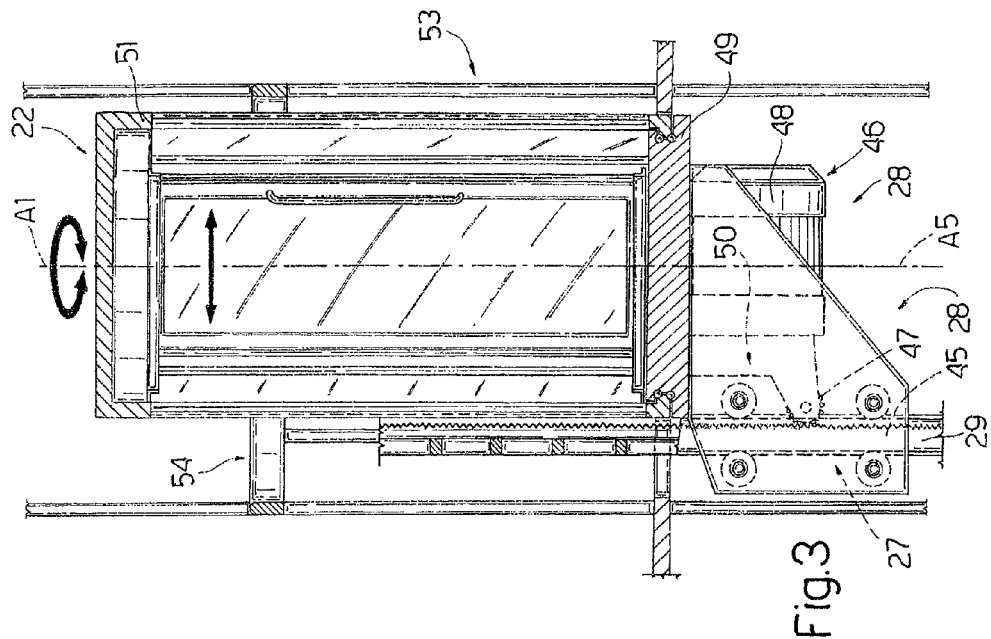
FIGS. 2 and 3 show larger-scale, partly sectioned side views, with parts removed for clarity, of a detail of the FIG. 1 wind power turbine.
Figure 3:
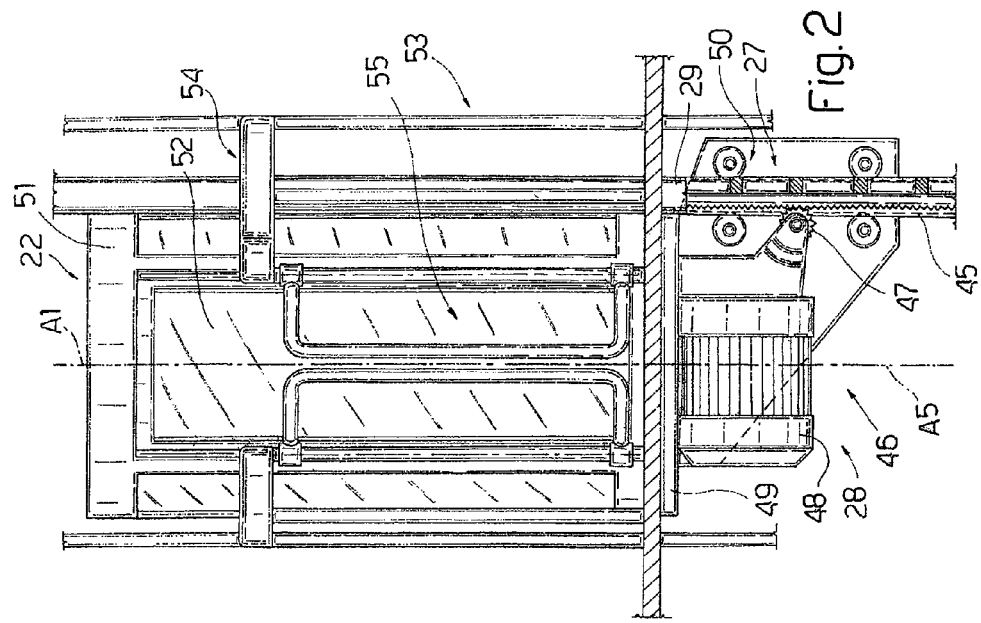

With reference to FIGS. 2 and 3, the actuating device of lift 21 comprises a rack 45 fixed to pylon 2; and an actuator 46 fitted to carriage 28 and comprising a pinion 47 engaging rack 45.

Actuator 46 comprises an electric motor 48, and is fitted to carriage 28, underneath elevator car 22. In the example shown in the drawings, and particularly in FIGS. 2 and 3, carriage 28 comprises a frame 49, which supports a set of wheels 50, on either side of each rail 29, and actuator 46.

Elevator car 22 extends along an axis A5, and rotates selectively about axis A5 with respect to carriage 28. More specifically, elevator car 22 is mounted to rotate about axis A5 on frame 49 of carriage 28.

In one embodiment of the present disclosure, elevator car 22 is in the form of a cylinder extending about axis A5, which coincides with axis A1 of pylon 2.

With reference to FIG. 4, elevator car 22 comprises a cylindrical lateral wall 51; and at least one door 52 opening into elevator car 22 and fitted in sliding manner to wall 51.

A cage 53 inside pylon 2 houses guide 27, and defines a compartment 54 in which elevator car 22 and carriage 28 run.

Cage 53 has gates 55 for access to elevator car 22 at first station 23 and intermediate station 25.

Cage 53 also isolates compartment 54 from the rest of the space inside pylon 2 housing cables and instruments (not shown) that could interfere with elevator car 22 and carriage 28 as these move along axis A1.

With reference to FIG. 1, guide 27, which is substantially in the form of a ladder, can be used as a means of connecting the bottom end of pylon 2 to nacelle 3.

The ladder can be used along compartment 54, as well as on the opposite side; for which purpose, a hatch 56 is formed in annular plate 32. Wind power turbine 1 also has a ladder 57 on the outside of pylon 2, for easy access to guide 27, and to enable use of guide 27 on the compartment 54 side, even when elevator car 22 is at first station 23.

Electric motor 48 can be powered by electric cables (not shown) or sliding contacts (not shown).

In one embodiment described, given the cylindrical shape of elevator car 22, the volume occupied inside nacelle 3 remains unchanged, regardless of the position of nacelle 3 with respect to pylon 2, and the opening in annular plate 32 is limited to the circular cross section of elevator car 22.

In one embodiment, housing guide device 33 in nacelle 3 has the advantage of creating ample room inside nacelle 3, and enabling access to nacelle 3 from below.

The present disclosure, however, also applies in the event guide device 33 is housed entirely inside pylon 2; in which case, guide device 33 again provides for increasing the space available inside wind power turbine 1.

In another embodiment, the guide device may comprise at least two articulated shafts connected to rotate about respective axes, or one articulated shaft designed to assume a number of configurations.

In another embodiment, the guide device provides for increasing the space inside the wind power turbine, and so enabling installation of a lift, freight lift, winch, and other equipment for operating and servicing the wind power turbine.

It should be understood that various changes and modifications to the presently preferred embodiments described herein will be apparent to those skilled in the art, for example, to the shape of the inflatable annular structures or to the means of connecting them. Such changes and modifications can be made without departing from the spirit and scope of the present subject matter and without diminishing its intended advantages. It is therefore intended that such changes and modifications be covered by the appended claims.

The invention is claimed as follows:

1. An electric energy producing wind power turbine comprising:
    a pylon extending from a bottom end to a top end;
    a nacelle fitted to the top end of the pylon and configured to rotate about a first axis;
    an electric generator fitted to the nacelle and configured to produce electric energy;
    a blade assembly configured to rotate with respect to the nacelle about a second axis;
    an electric cable bundle extending from the electric generator to a point inside the pylon; and
    a guide device connected to the cable bundle and including an elongated member articulated to extend along a designated guide path, wherein the cable bundle extends about the elongated member and the guide device is configured to guide the cable bundle to:
        (i) divert the cable bundle radially from a point close to the first axis to a point away from the first axis, and
        (ii) rotate the cable bundle, wherein a first end of the elongated member is fixed to the nacelle and is configured to rotate together with the nacelle and the cable bundle.

2. The wind power turbine of claim 1, wherein a second end of the elongated member is rotatably fitted to the pylon.

3. An electric energy producing wind power turbine comprising:
    a pylon extending from a bottom end to a top end;
    a nacelle fitted to the top end of the pylon and configured to rotate about a first axis;
    an electric generator fitted to the nacelle and configured to produce electric energy;
    a blade assembly configured to rotate with respect to the nacelle about a second axis;
    an electric cable bundle extending from the electric generator to a point inside the pylon; and
    a guide device connected to the cable bundle and including a first shaft integral with the nacelle and the cable bundle and extending along the first axis, and a second shaft which is connected to the first shaft, is integral with the cable bundle, and extends along a third axis offset radially with respect to the first shaft, the guide device being configured to guide the cable bundle to:
        (i) divert the cable bundle radially from a point close to the first axis to a point away from the first axis, and
        (ii) rotate the cable bundle.

4. The wind power turbine of claim 3, wherein the third axis is parallel to the first axis.

5. The wind power turbine of claim 3, wherein the second shaft is connected to the pylon and configured to rotate about the third axis.

6. The wind power turbine of claim 3, wherein the first shaft is connected to the second shaft by a third shaft which extends along a fourth axis sloping with respect to the first axis and the third axis.

7. The win power turbine of claim 6, wherein the third shaft is connected to the first shaft and the second shaft by a first and a second universal joint.

8. The wind power turbine of claim 6, wherein: the first shaft is fixed to the nacelle and is configured to rotate about the first axis,
    the second shaft is configured to rotate about the third axis; and
    the third shaft is configured to rotate about the fourth axis.

9. An electric energy producing wind power turbine comprising:
    a pylon extending from a bottom end to a top end;
    a nacelle fitted to the top end of the pylon and configured to rotate about a first axis;
    an electric generator fitted to the nacelle and configured to produce electric energy;
    a blade assembly configured to rotate with respect to the nacelle about a second axis;
    an electric cable bundle extending from the electric generator to a point inside the pylon;
    a guide device connected to the cable bundle and configured to guide the cable bundle to:
        (i) divert the cable bundle radially from a point close to the first axis to a point away from the first axis, and (ii) rotate the cable bundle; and a lift having a car configured to move along the first axis between a first station and a second station which is located directly beneath and alongside the guide device.

10. The wind power turbine of claim 9, wherein the nacelle comprises a compartment configured to house the guide device and said car at the second station, regardless of the position of the nacelle with respect to the pylon.

11. The wind power turbine of claim 9, wherein the lift comprises:

a guide located inside the pylon and extending along the first axis; and a carriage fitted to the guide and configured to run along the first axis.

12. The wind power turbine of claim 11, wherein said car is mounted on the carriage.

13. The wind power turbine of claim 11, wherein said guide comprises two rails parallel to the first axis and a succession of rungs crosswise to the rails.

14. The wind power turbine of claim 9, wherein the lift comprises an actuating device controllable from the car.

15. The wind power turbine of claim 14, wherein the actuating device comprises a rack fixed to the pylon, and an actuator fitted to the carriage and including a pinion configured to engage the rack.

16. The wind power turbine of claim 9, wherein the lift is configured to be stopped at an intermediate station located between the first and the second station.

17. The wind power turbine of claim 16, including a panoramic platform located along the pylon and extending about the pylon, said intermediate station being located at the panoramic platform.

18. The wind power turbine of claim 9, wherein the car extends along a fifth axis and is configured to selectively rotate about the fifth axis.

19. The wind power turbine of claim 18, wherein the car is in the form of a cylinder extending about the fifth axis.

20. The wind power turbine of claim 18, wherein the fifth axis coincides with the first axis.

21. The wind power turbine of claim 18, wherein the car is mounted to rotate about the fifth axis with respect to a carriage.

22. The wind power turbine of claim 18, wherein the car comprises a lateral wall and at least one door which is configured to open into the car.

23. The wind power turbine of claim 22, wherein the door is slideably fitted to the lateral wall.

24. An electric energy producing wind power turbine cable bundle guide device configured to operate with a wind power turbine, said wind power turbine including a pylon extending from a bottom end to a top end, a nacelle fitted to the top end of the pylon and configured to rotate about a first axis, an electric generator fitted to the nacelle and configured to produce electric energy, a blade assembly configured to rotate with respect to the nacelle about a second axis, and an electric cable bundle extending from the electric generator to a point inside the pylon, said cable bundle guide device comprising:

an elongated member articulated to extend along a designated guide path and connected to the cable bundle, said elongated member having an end fixed to the nacelle, and being configured to rotate together with the nacelle and the cable bundle to:

(i) divert the cable bundle radially from a point close to the first axis to a point away from the first axis, and (ii) rotate the cable bundle.

25. An electric energy producing wind power turbine cable bundle guide device configured to operate with a wind power turbine, said wind power turbine including a pylon extending from a bottom end to a top end, a nacelle fitted to the top end of the pylon and configured to rotate about a first axis, an electric generator fitted to the nacelle and configured to produce electric energy, a blade assembly configured to rotate with respect to the nacelle about a second axis, and an electric cable bundle extending from the electric generator to a point inside the pylon, said cable bundle guide device comprising:

an elongated member articulated to extend along a designated guide path and having an end rotatably fitted to the pylon, the cable bundle extending about the elongated member and said elongated member being connected to the cable bundle and configured to guide the cable bundle to:

(i) divert the cable bundle radially from a point close to the first axis to a point away from the first axis, and (ii) rotate the cable bundle.

26. An electric energy producing wind power turbine cable bundle guide device configured to operate with a wind power turbine, said wind power turbine including a pylon extending from a bottom end to a top end, a nacelle fitted to the top end of the pylon and configured to rotate about a first axis, an electric generator fitted to the nacelle and configured to produce electric energy, a blade assembly configured to rotate with respect to the nacelle about a second axis, and an electric cable bundle extending from the electric generator to a point inside the pylon, said cable bundle guide device connected to the cable bundle and comprising:

a first shaft integral with the nacelle and the cable bundle and extending along the first axis; and a second shaft connected to the first shaft, integral with the cable bundle, and extending along a third axis offset radially with respect to the first shaft;

wherein the cable bundle guide device is configured to:

(i) divert the cable bundle radially from a point close to the first axis to a point away from the first axis, and (ii) rotate the cable bundle.

* * * * *

UNITED STATES PATENT AND TRADEMARK OFFICE
CERTIFICATE OF CORRECTION

PATENT NO.        : 8,274,170 B2
APPLICATION NO.   : 12/755131
DATED             : September 25, 2012
INVENTOR(S)       : Thomas Kassner Page 1 of 1

It is certified that error appears in the above-identified patent and that said Letters Patent is hereby corrected as shown below:

ON THE TITLE PAGE OF THE PATENT, Line (73) should read:

Assignee: Wilic S.AR.L.

Signed and Sealed this
Fifth Day of February, 2013

Teresa Stanek Rea
*Acting Director of the United States Patent and Trademark Office*